INVENTOR.
BY Gaylord W. Brown
Learman & McCulloch

INVENTOR.
BY GAYLORD W. BROWN
Learman & McCulloch

June 8, 1971        G. W. BROWN        3,583,036
DOUBLE WEB DIFFERENTIAL FORMING APPARATUS
Filed April 7, 1969        5 Sheets-Sheet 5

INVENTOR.
BY GAYLORD W. BROWN
Learman & McCulloch

United States Patent Office 3,583,036
Patented June 8, 1971

3,583,036
DOUBLE WEB DIFFERENTIAL FORMING
APPARATUS
Gaylord W. Brown, Beaverton, Mich., assignor to
Koehring Company, Milwaukee, Wis.
Filed Apr. 7, 1969, Ser. No. 814,527
Int. Cl. B29c 17/04
U.S. Cl. 18—19                                   18 Claims

ABSTRACT OF THE DISCLOSURE

Apparatus and methods for forming a container or like hollow article in a pair of heat fusible, thermoplastic sheets mounted in spaced relation in an indexible clamp frame assembly wherein the frame assembly is advanced from a heating station to a pair of molds which close to heat fuse the sheets and differential pressure form the article therein. An air stream injector carried by the frame assembly introduces heated air to maintain the heated and sagging sheets apart until the molds are closed, and cool air under greater pressure is then introduced by the injector to form the article. A perimetral channel is provided in the molds immediately adjacent to the cavities therein which is filled with forming air by the injector and aids in the rapid cooling effected.

---

One of the prime objects of the invention is to provide apparatus of the character described wherein an indexible clamp frame assembly, carrying its own stream injector assembly, is employed to move the pair of heated plastic webs to and beyond container forming molds so that relatively high rates of production may be achieved.

Another object of the invention is to provide dual sheet forming apparatus to replace parison forming blow molding techniques and permit articles such as milk bottles, jugs and the like to be differential pressure formed on a production basis in separable mold halves mounted on reciprocable platens.

Still another object of the invention is to provide reliable and economic two sheet forming apparatus of an improved character wherein both pressure and suction forces may be utilized in forming and wherein a separation of the heated and sagging sheets is maintained by a heated air stream which also aids in maintaining the sheets at the forming temperature desired at the mold.

A further object of the invention is to provide relatively rapidly cycling apparatus of the character described wherein a mold cavity surrounding, cooling channel is formed to prevent the thermally joined sheets from storing heat adjacent the article formed in the mating cavity portions and impeding the rapid cooling thereof.

Still a further object of the invention is to provide apparatus of the character described wherein a reduced thickness parting seam is formed between the formed article and cooling channel to facilitate the ready separation of the formed article from the cooling channel and web.

Figure 1:
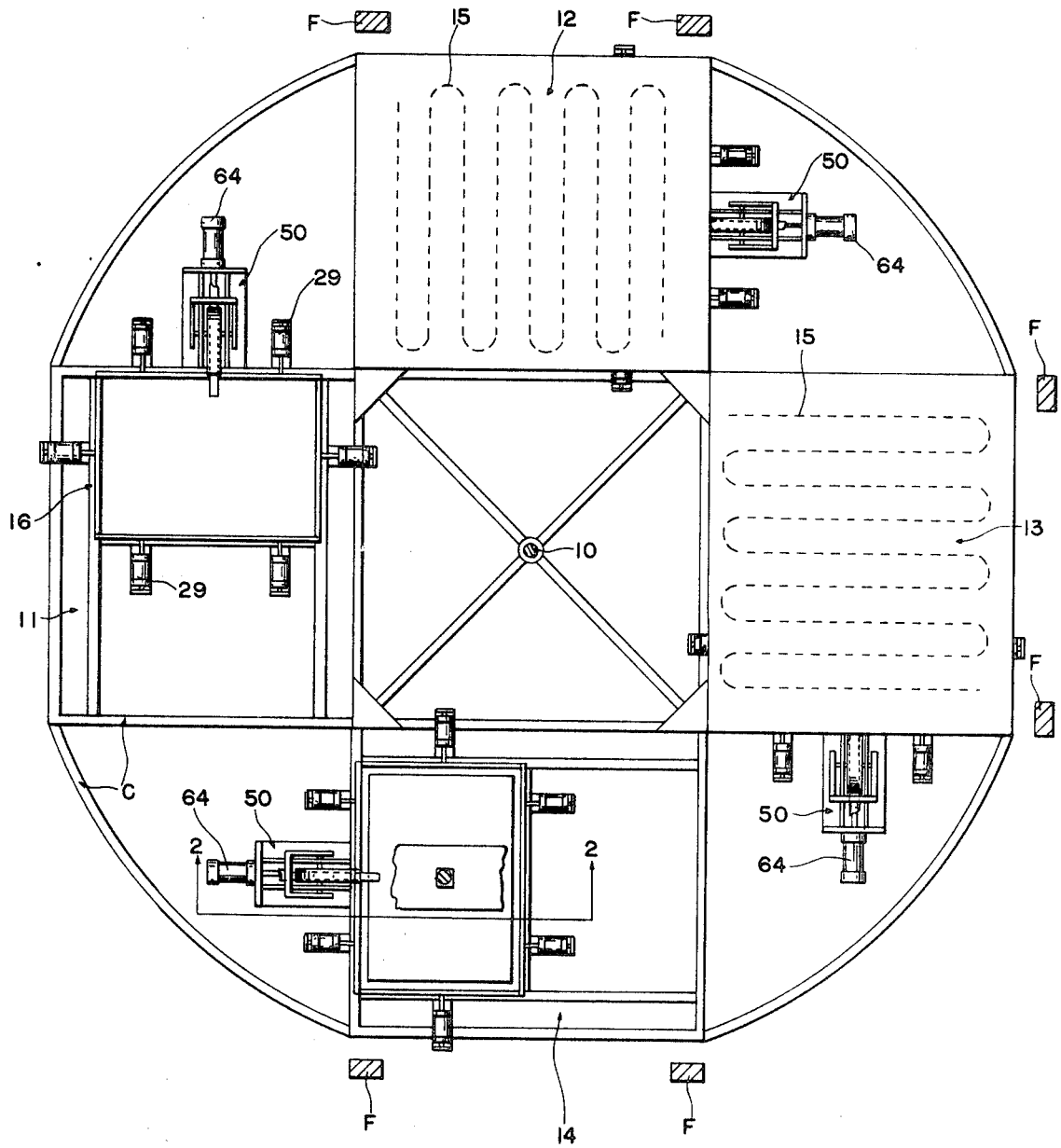
FIG. 1 is a partly schematic, top plan view illustrating a multiple station rotary thermoforming machine wherein the invention is employed.

Referring now more particularly to the accompanying drawings and in the first instance particularly to FIG. 1 wherein a rotary thermoforming machine is illustrated, a letter C generally indicates a rotary frame work carrier which is mounted for indexing rotary movement on a central shaft 10 in the usual manner. The shaft 10 is mounted by a stationary frame F shown only fragmentarily which provides a loading station generally designated 11, heating stations generally designated 12 and 13, and a forming station generally designated 14. At the heating stations 12 and 13, conventional resistance type heating elements 15 are provided above and below the rotary path of the four clamp frame assemblies generally designated 16 which are revolved with the carrier C consecutively to the various stations. At the forming station 14, the frame F supports upper and lower mold members 17 and 18, respectively (see FIG. 2), on platens 19 and 20, respectively, which may be operated by the piston rods 21 and 22 of conventional double-acting fluid pressure actuated cylinders 23 mounted on the frame F.

Figure 2:
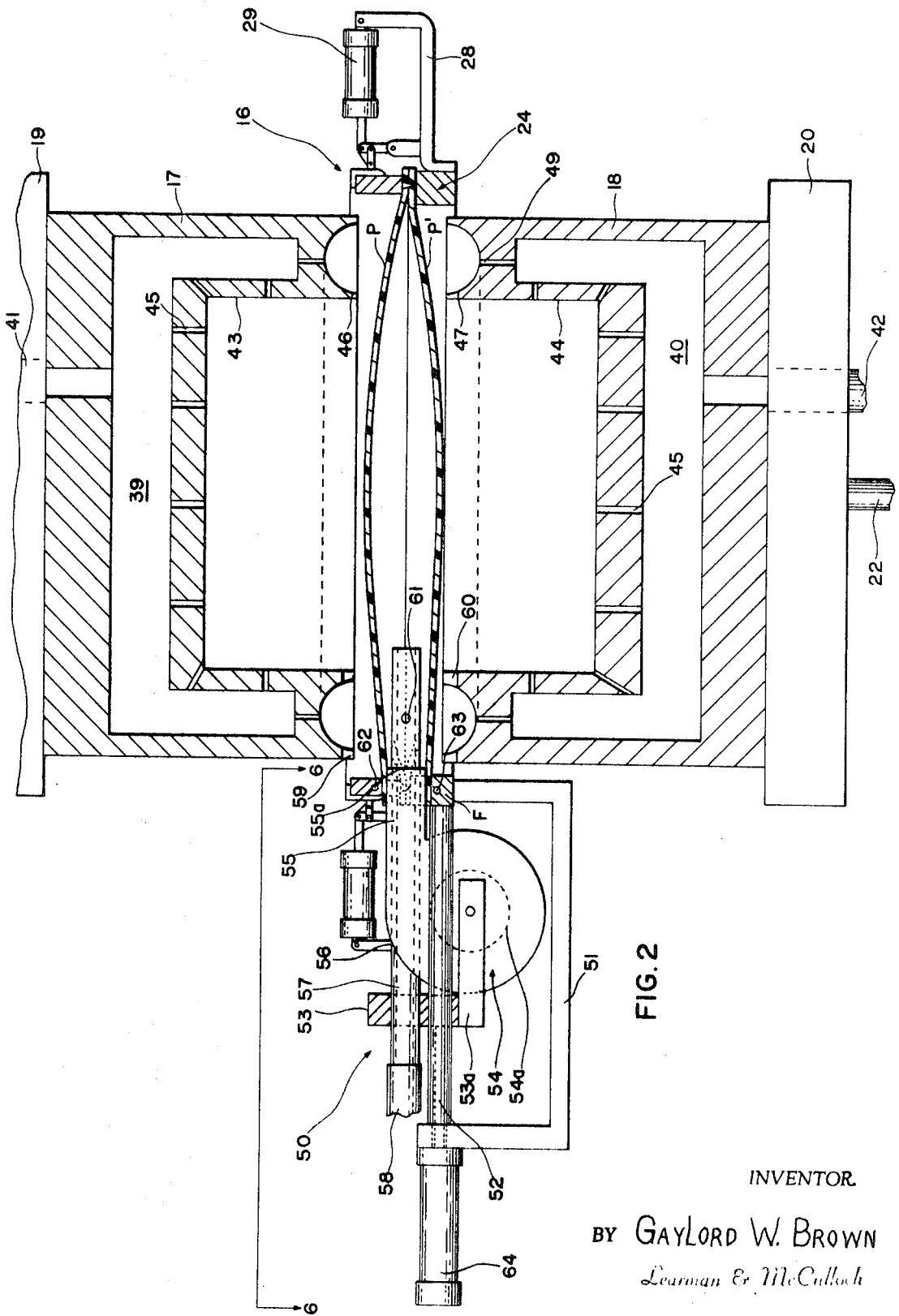
FIG. 2 is an enlarged, transverse, sectional view through one of the mold assemblies at the forming station taken on the line 2—2 of FIG. 1 and showing the molds in separated relationship.

As has been indicated, the clamp frame assemblies 16 are provided to clamp a pair of juxtaposed thermoplastic sheets and move them successively from the loading station 11 between the vertically spaced banks of heaters at stations 12 and 13 and, when the molds 17 and 18 are in separated position as shown in FIG. 2, to the forming station 14. Suitable synthetic plastic webs which may be thermoformed in the manner to be described are polystyrene, polyethylene, and polypropylene, but it is contemplated that various thermoplastic materials may be formed in the manner indicated to form parts such as containers of various types and other articles. The webs which are carried by the clamp frame assembly 16 are identified at P and P' and it is to be understood that the station 11 is both a manual loading and unloading station.

Figure 3:
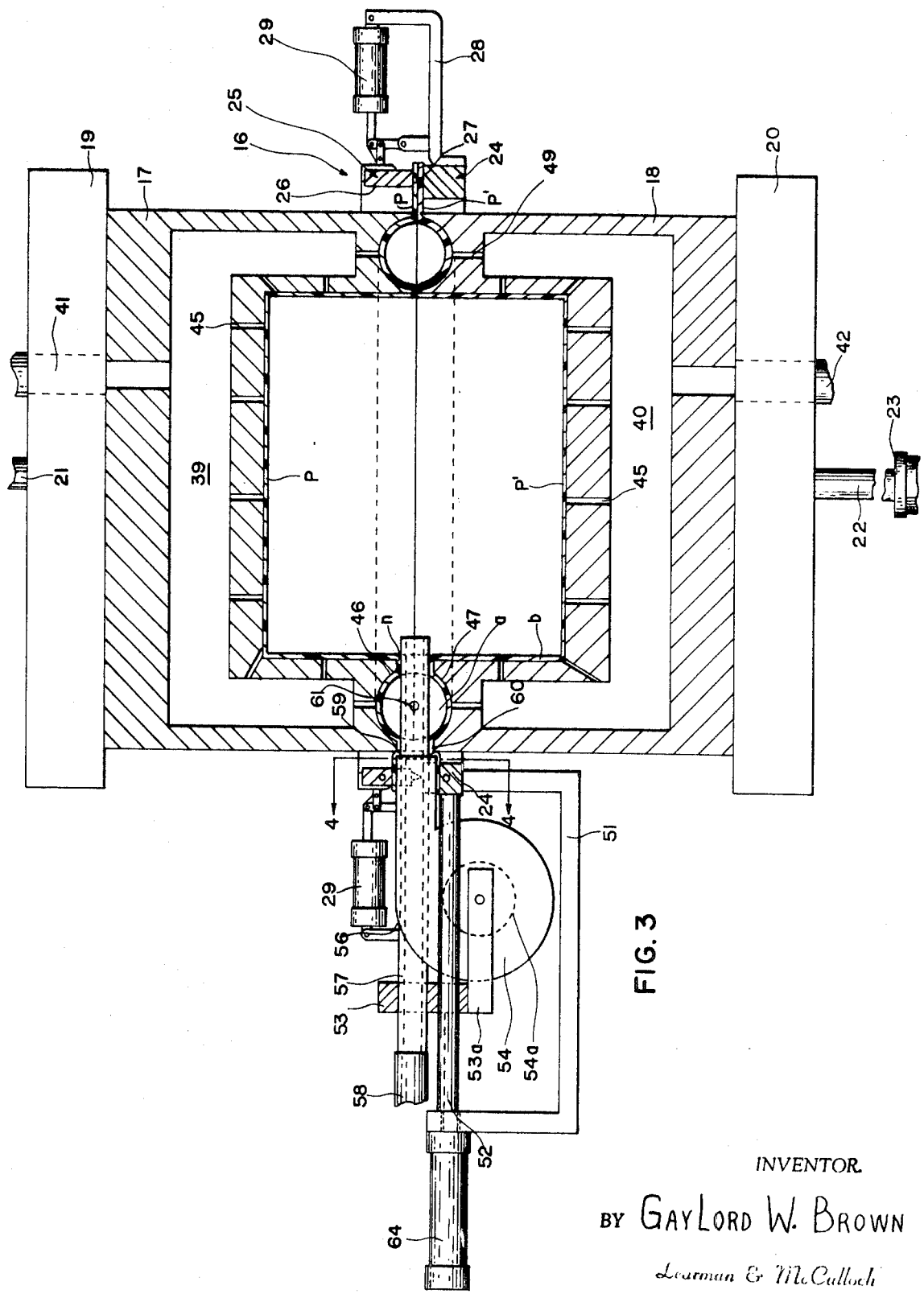
FIG. 3 is a similar transverse, sectional view showing the molds in closed position.
Figure 5:
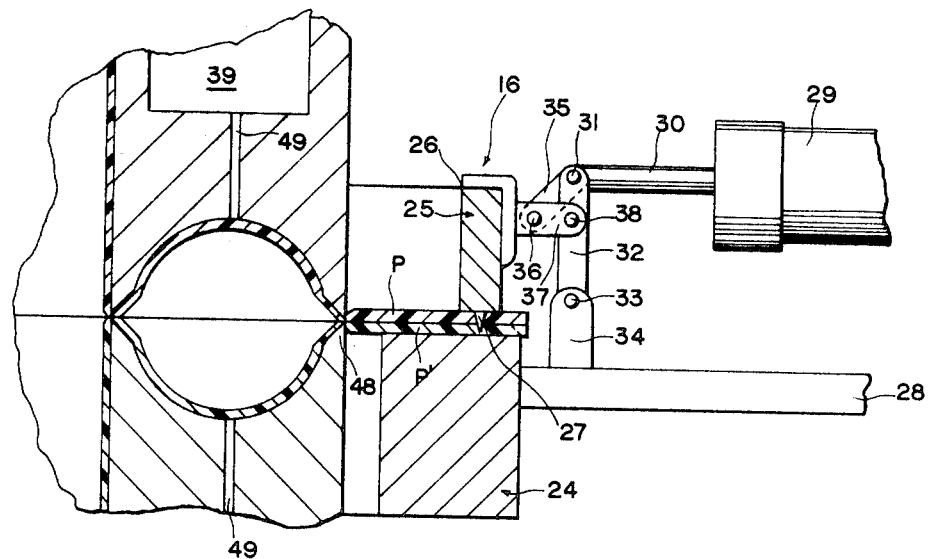
FIG. 5 is an enlarged, fragmentary, sectional elevational view more particularly illustrating the manner in which the sheet cooling air channel is formed, the view illustrating the manner in which the plastic sheet portions in the molds bordering the mold cavities are stretched and separated to enhance air cooling of the sheets which enables a speed up in the forming cycle.

As shown particularly in FIGS. 3 and 5, each clamp frame assembly includes a lower hollow frame member 24 forming part of the frame F, and a separable upper frame assembly, generally designated 25. Each separable frame 25 is made up of side rails 26 which snugly fit to form the frame 25, and includes web penetrating pins 27 in spaced apart relation along their lower edge. Mounted on each side of the fixed frame 24 are support brackets 28 for double-acting fluid pressure operated cylinders 29 which have their piston rods 30 pivotally connected at 31 (FIG. 5) to rail-operating levers or links 32, which are pivotally connected as at 33 to fixed posts 34 on the brackets 28. Each pin 31 also pivotally connects a link 35 to each piston rod 30, the opposite end of each link 35 being pivotally connected as at 36 to an arm 37 which is pivotally connected to each link 32 as at 38. When the piston rod 30 (shown in FIG. 5) is withdrawn or retracted, the frame rail 25 is swung outwardly about pivot pin 33, and at the same time is swung upwardly about pivot pin 38. It is to be undestood that a cylinder 29 is provided on each side of frame 25, and that the side walls 26 of the frame 25 are moved upwardly simultaneously when it is desired to remove the formed sheets P and P' from the clamp frame assembly 16 at the loading and unloading station 11.

As FIGS. 2 and 3 particularly indicate, both the upper and lower molds 17 and 18 are provided with vacuum manifolds 39 and 40, respectively, which communicate respectively with vacuum source lines 41 and 42. The mold cavities 43 and 44 of the molds 17 and 18, respectively, are provided with ports 45 communicating with the manifolds 39 and 40.

It will be noted that the lower edge of the mold 17 and the upper edge of the mold 18 are perimetrally channeled as at 46 and 47, respectively, and it is to be understood that the channels 46 and 47 and all of the side walls of the molds 17 and 18 connect to form a continuous passage. The particular mold cavities 43 and 44 shown are configured to form a jug-like container from the plastic webs P and P', having a body portion $b$ and a neck portion $n$ in FIG. 3. As FIG. 5 particularly indicates, the edges of the channel portions 46 and 47 of the molds 17 and 18 are relatively sharp, as at 48, and penetrate the plastic webs P and P' to a sufficient extent so that when the webs are moved to the loading and unloading station 11 and removed from the frames 24 and 25, a sharp blow will serve to separate the container or article formed from the remaining flash portions of webs P and P'. Vacuum ports 49 extend between the channel portions 46 and 47 and the manifolds 39 and 40, as shown particularly in FIG. 5.

Figure 6:
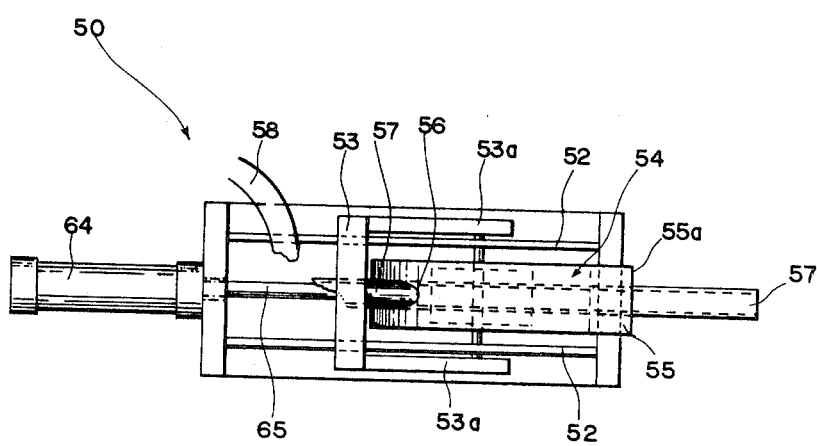
FIG. 6 is an enlarged, fragmentary, top plan view taken on the line 6—6 of FIG. 2.

As FIGS. 2 and 3 indicate, each clamp frame assembly has associated with it an air-supplying assembly generally designated 50, which furnishes both a warm air stream under low pressure to maintain the separation of the sheets P and P', as indicated in FIG. 2, during their movement through the heating stations 12 and 13, and to the forming station 14, and a source of high pressure air at room temperature, which is utilized at the forming station to aid the differential pressure forming operation and, at the same time, help cool the container or article which is thermoformed. The assembly 50 includes a main support bracket 51 supported by the frame F (including the lower clamp frame 24), which mounts a pair of stationary guide rods 52 (see FIG. 6). Mounted to move forwardly and rearwardly on the rods 52 is a guide plate 53, having a pair of extension legs 53a which support a blower fan generally designated 54. The blower fan 54, which is a conventional fan available in the market place, includes a heating element 54a for heating the air which is drawn through an axial opening and delivered to an outlet portion 55 having a discharge edge 55a, terminating just outward of the vertical path of the molds 17 and 18. The fan 54 is provided to supply a continuous source of warm air under a typical pressure of approximately .01 p.s.i. and at a typical temperature of approximately 275° F. to the space between the plastic sheets P and P', as illustrated in FIG. 2, during the time the particular clamp frame assembly 16 is indexing from the loading station 11 around to the forming station 14. The air delivered by fan 54 is not under a pressure sufficient to move the plastic sheets P and P' into engagement with the cavity walls 43 and 44 and, rather, is provided to keep them in separated position during the time they are being heated to forming temperature. A typical forming temperature may be on the order of 300° F.

Also connected to the side plate 53 and extending through an opening 56, provided in the rear of the fan housing 54, is a blow-tube 57 which is connected to a flexible high pressure air line 58 in communication with a source of high pressure forming air at ambient temperatures. Typically, the line 58 may deliver air at a typical forming pressure of about 50 p.s.i. to the interior of the molds 17 and 18 at a typical room temperature of approximately 70° F. when the blow-pipe 57 is moved through the openings 59 and 60 provided through the one side of each of the molds 17 and 18, as shown in FIG. 3.

Figure 4:
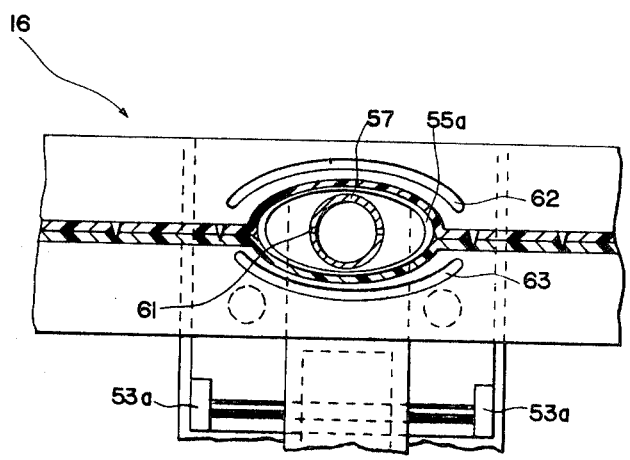
FIG. 4 is an enlarged, fragmentary, transverse sectional view taken on the line 4—4 of FIG. 3.

As FIG. 4 particularly indicates, laterally opposed ports 61 are provided in each blow pipe 57 in a position such that when the blow pipe 57 is disposed in inward position, high pressure air will be delivered to the perimetral air channel $a$ formed in the plastic webs P and P' when they are deformed to assume the configuration of channels 46 and 47. As FIG. 4 also indicates, upper and lower arcuate heater members 62 and 63 are provided substantially surrounding the delivery end of fan duct 55 for a purpose which will be later described. Provided to move the slide plate 53, and thereby the fan 54 and blow tube 57, inwardly and outwardly is a double-acting fluid pressure actuated cylinder 64, which has its piston rod 65 (FIG. 6) connected to the plate 53.

THE OPERATION

In operation, an operator at the loading and unloading station 11, after unloading previously formed sheets from a clamp frame assembly 16, will reload the clamp frame assembly 16 by first of all inserting a bottom sheet P'. The continuously operated relative low temperature heater 63 maintains a portion of lower frame 24 at a high enough temperature to rapidly deform the plastic web P', as shown in FIG. 4. After a short time during which this deformation occurs, the operator may then load the second plastic sheet P to the frame 16. Just prior to loading sheet P, cylinder 64 is operated to move the fan 54 and blow tube 57 inwardly from initial remote position. The heater 62 will operate in the same manner as heater 63 to deform an edge portion of the plastic sheet P which is prevented by the duct portion 55 of heater 54 from sagging beyond the duct portion 55. Also at this time heater 54 will be delivering heated air to maintain the sheets P and P' in the separated condition which is illustrated in FIG. 2. When the particular clamp frame assembly 16 has moved around to the forming station 14, cylinders 23 are operated to move the molds 17 and 18 from the position in which they are shown in FIG. 2 to the position in which they are shown in FIG. 3 into a state of engagement with the plastic web portions P and P'. When the molds 17 and 18 reach engaged position vacuum is applied through the ports 45 to draw the sheets P and P' into the cavities 43 and 44. Just before the molds 17 and 18 contact webs P and P' air pressure is delivered through the blow pipe 57 to initially aid in keeping the edge portions of the webs P and P' apart and to then aid the differential pressure forming operation. Simultaneously, also, air under pressure is released through the ports 61 to assist in forming the perimetral air channel $a$.

When the carrier C then indexes the particular frame 16 to the loading and unloading station, cylinder 64 is actuated to retract the plate 53 and remove the blow pin 57 and fan duct portion 55 from between the plastic sheets P and P' just before the particular clamp frame assembly reaches the loading and unloading station 11. Because the edges 48 have squeezed the plastic webs P and P' and formed a portion of greatly reduced thickness or parting line, the container which is formed can be readily separated from the excess or flash portions of the webs P and P'. The formation of channel $a$ greatly speeds up the cooling or setting of the hot plastic portions "$b$" and "$n$," and permits the earlier separation of the containers formed from the flash portions. The fact that the fused and joined flash edge portions of sheets P and P' outward of channel "$a$" remain relatively warm will not then delay the forming operation. Since four clamp frame assemblies 16 are utilized in this four-station machine, it is clear that one clamp frame is moved to a forming station 14 while another is leaving it to proceed to the loading and unloading station and the formation of containers is carried on in a continuous manner.

Conventional Geneva or cam indexing mechanisms may be used to drive the carrier C, which is indexed through 90° movements, following a period of dwell of sufficient length to permit the forming and loading and unloading operations to take place. While the frame assembly 16 is illustrated for the sake of simplicity as forming only one container at a time, it is to be understood that more than one pair of molds 17 and 18 could be provided at the forming station 14 and multiple clamp frame assemblies 16 could be utilized at each station. Further, the air delivery assembly 50 could be pivotally mounted to swing vertically into and out of position rather than mounted for reciprocating movement as illustrated in the present drawings.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. Apparatus for differential pressure forming hollow plastic containers with a pair of deformable thermoplastic sheets comprising:
   at least one heating station;
   a forming station;
   rotatably mounted frame means for supporting a pair of thermoplastic sheets by their edge portions;
   means for indexing said frame means and sheets from said heating station to said forming station;
   said forming station including:
      a pair of relatively movable mold members, each having a mold cavity, at least one of said mold members being movable toward and away from the other to closed and remote positions respectively;
      means for moving said one mold member to the closed position to clamp said sheets between said mold members and fuse portions of the sheets around said cavities;
   means carried by said rotatably mounted frame means for introducing a fluid at a first predetermined temperature and at a first predetermined pressure between said sheets to warm said sheets while said sheets are being moved from said heating station to said forming station; and
   means for introducing a fluid at a second predetermined temperature and pressure between said sheets after said mold members are closed to form portions of said sheets to the shape of said cavities.

2. Apparatus as set forth in claim 1 wherein said second predetermined temperature of said fluid is lower than said first temperature to cool said sheets and said second pressure is higher than said first pressure.

3. Apparatus as set forth in claim 1 wherein each of said mold members further includes a perimetral flange around said cavities which form a perimetral passage when said mold members are closed.

4. Apparatus as set forth in claim 3 wherein said means for introducing a fluid at a second predetermined temperature and pressure includes means for simultaneously introducing fluid into said perimetral passage.

5. Apparatus for differential pressure forming hollow plastic containers with a pair of deformable thermoplastic sheets comprising:
   a pair of relatively movable mold members, each having a mold cavity, at least one of said mold members movable toward and away from the other to closed and open positions, respectively;
   means for supporting a pair of thermoplastic sheets by their edge portions between said mold members;
   means for moving said one mold member to the closed position to clamp said sheets between said mold members and fuse portions of the sheets around said cavities;
   first means for introducing a heated fluid at a first predetermined temperature and pressure between said sheets before said mold members are closed to maintain the midportions of the sheets separated; and
   second means for introducing a fluid at a second predetermined lesser temperature and higher pressure between said sheets after said mold members are closed to form portions of said sheets to the shape of said cavities.

6. Apparatus for differential pressure forming hollow plastic containers as set forth in claim 5 wherein said first means for introducing said heated fluid comprises heater means and blower means for blowing heated air between said sheets and said second means for introducing a fluid includes means for introducing air at ambient temperature.

7. Apparatus as set forth in claim 6 wherein said first and second means for introducing fluids are reciprocably mounted relative to said mold members; and means for reciprocating said first and second means.

8. Apparatus as set forth in claim 6 wherein said first means for introducing a fluid includes duct means extending toward said mold members; and said second means for introducing a fluid includes a blow tube extending into said duct means.

9. Apparatus as set forth in claim 5 wherein said first and second means for introducing fluids include first and second tubular members extending toward said mold members, said second tubular member including at least one port in the side of said tube spaced from the end of said tube.

10. Apparatus as set forth in claim 9 wherein each said mold members include a perimetral channel around said cavities which form a perimetral passage when said mold members are closed.

11. Apparatus as set forth in claim 10 further including means for moving said second tubular member into such position that the end of said tube communicates with said cavities and said ports communicate with said perimetral passage.

12. Apparatus for differential pressure forming hollow plastic containers with a pair of deformable thermoplastic sheets comprising:
   a pair of relatively movable mold members, each of said mold members including a mold cavity and an outwardly adjacent perimetral channel means;
   at least one of said mold members being movable toward and away from the other to closed and open positions, respectively, said channel means forming a continuous perimetral passage when said mold members are in said closed position;
   means for supporting a pair of thermoplastic sheets by their edge portions between said mold members;
   means for moving said one mold member to the closed position to clamp said sheets between said mold members and fuse portions of the sheet around said cavities and around the passage formed by said channel means; and
   means for applying a differential pressure to said mold members to form portions of said sheets to the shape of said cavities and said channels.

13. Apparatus as set forth in claim 12 further including means for introducing a cooling fluid into said passage to cool said fused portion and form a portion of said sheet to the shape of said channel means.

14. Apparatus as set forth in claim 13 wherein said means for introducing a cooling fluid into said passage simultaneously introduces a cooling fluid into said cavities.

15. Apparatus as set forth in claim 12 further including means for introducing a first fluid means between said sheets before said mold members are closed to maintain the midportions of the sheets separated.

16. Apparatus as set forth in claim 15 further including second means for introducing a second fluid means between said sheets after said mold members are closed to flow through said passage and cool said sheets.

17. Apparatus as set forth in claim 16 wherein said first fluid means is at a higher temperature than that of said second fluid means and said second fluid means is introduced at a higher pressure than that of said first fluid means.

18. Apparatus for differential pressure forming hollow plastic containers with a pair of deformable thermoplastic sheets comprising:
- at least one heating station;
- a forming station;
- frame means for supporting a pair of thermoplastic sheets by their edge portions;
- means for indexing said frame means and sheets from said heating station to said forming station;
- said forming station including:
  - a pair of relatively movable mold members, each having a mold cavity, at least one of said mold members being movable toward and away from the other to closed and remote positions respectively.
  - means for moving said one mold member to a closed position to clamp said sheets between said mold members and fuse portions of the sheets around said cavities;
  - means carried by said frame means for introducing a fluid between said sheets to maintain them separated while said sheets are being moved from said heating station to said forming station and before the mold members are in closed position; and
  - means for introducing a fluid between said sheets after said mold members are closed to aid in forming portions of said sheets to the shape of said cavities.

References Cited
UNITED STATES PATENTS

| | | | |
|---|---|---|---|
| 2,819,490 | 1/1958 | Froot | 18—20 |
| 3,243,847 | 4/1966 | Fogelberg et al. | 18—5 |
| 3,412,183 | 11/1968 | Anderson et al. | 264—40 |

J. SPENCER OVERHOLSER, Primary Examiner

L. R. FRYE, Assistant Examiner

U.S. Cl. X.R.

18—5